Jan. 9, 1951  A. L. GRISÉ  2,537,751
OSCILLATING CYLINDER PISTON METER
Filed Oct. 10, 1947  9 Sheets-Sheet 1

INVENTOR
ALFRED L. GRISÉ
BY
Chapin & Neal
ATTORNEYS

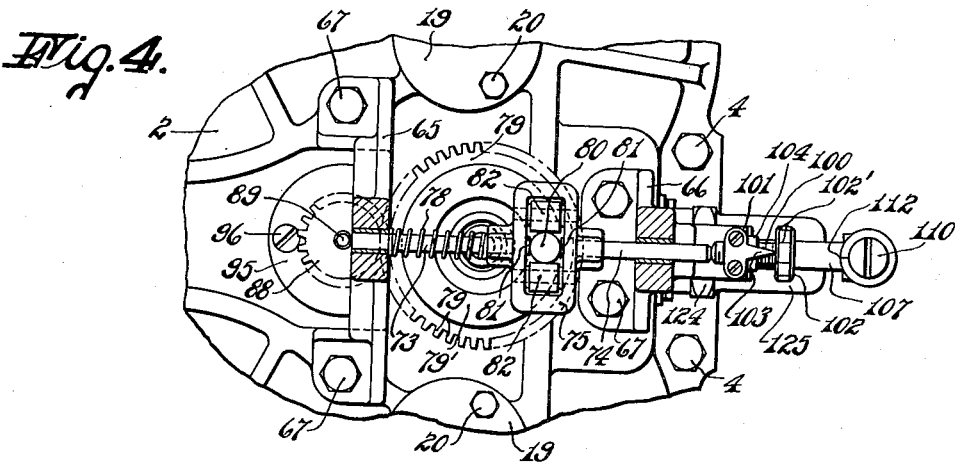
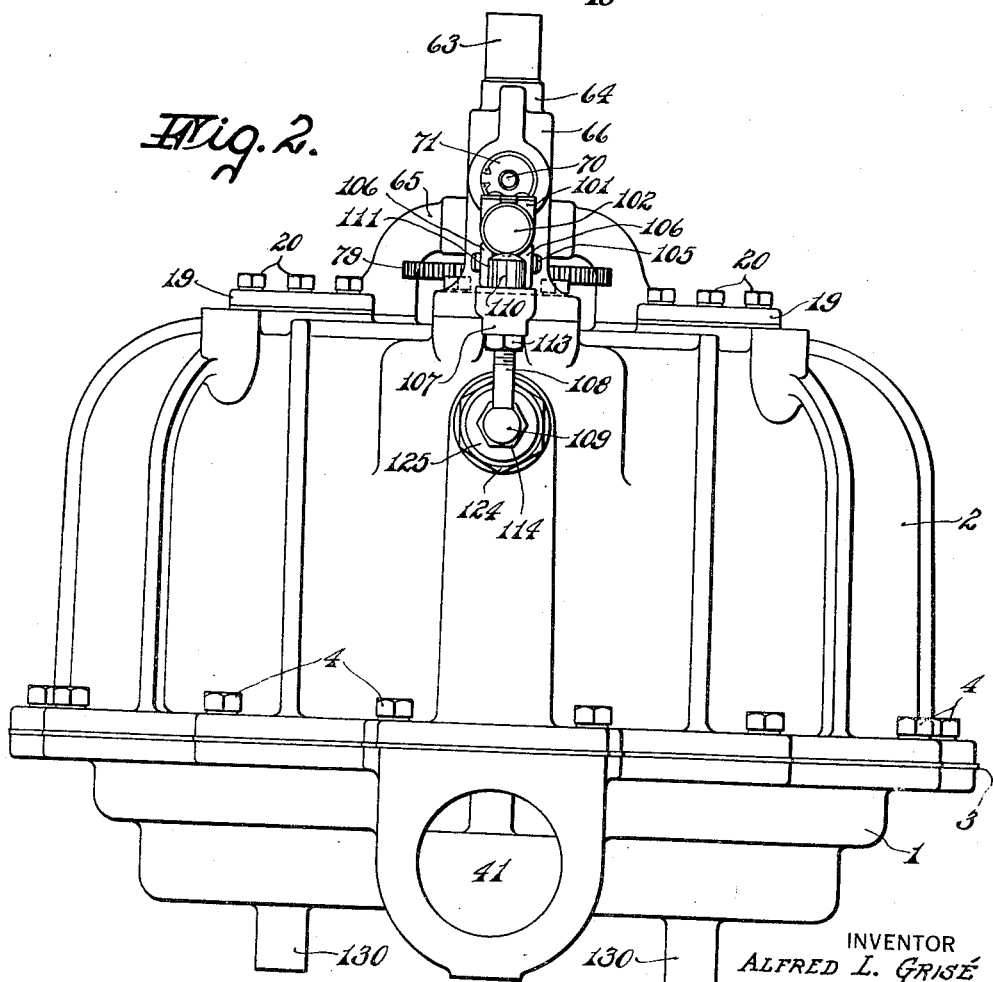

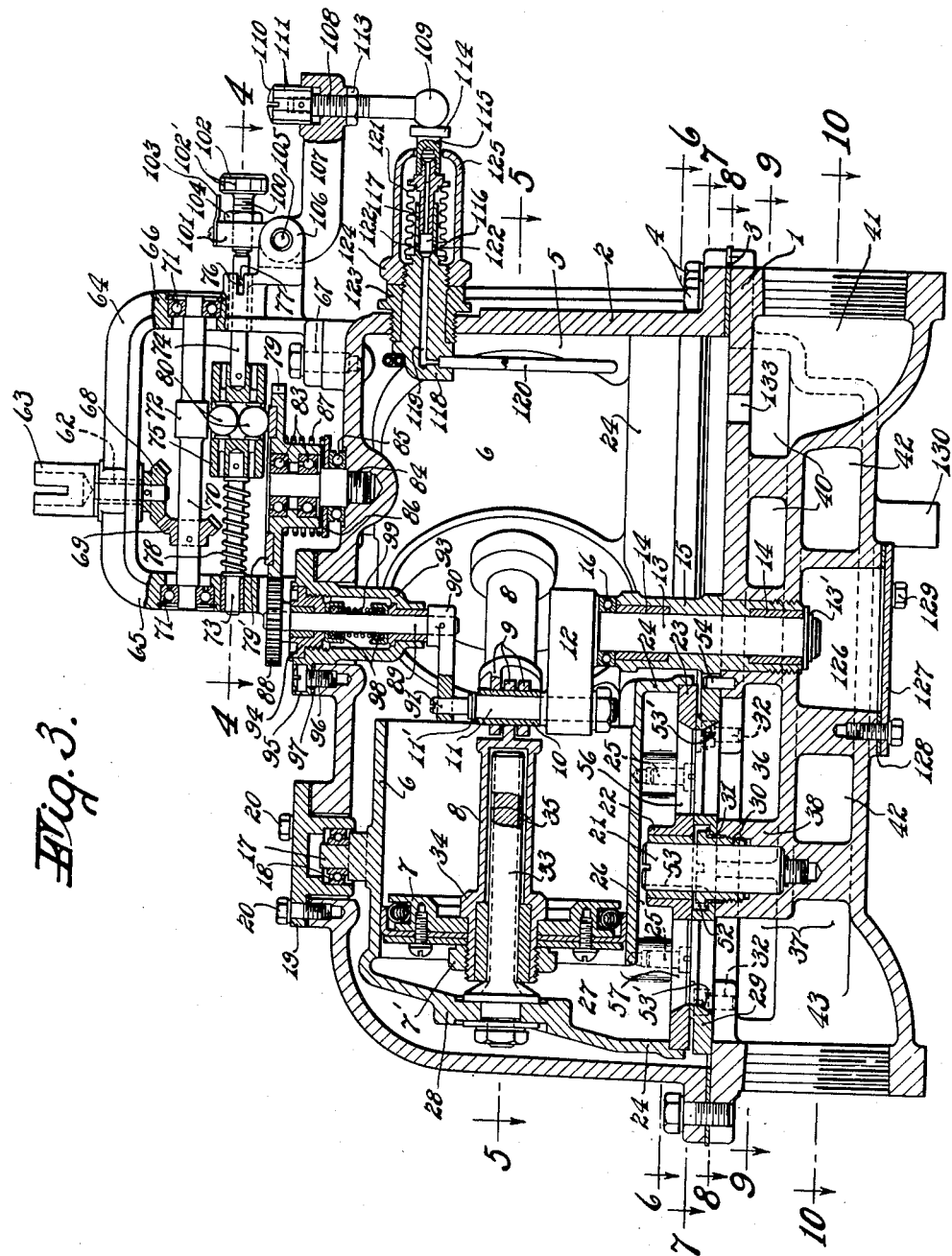

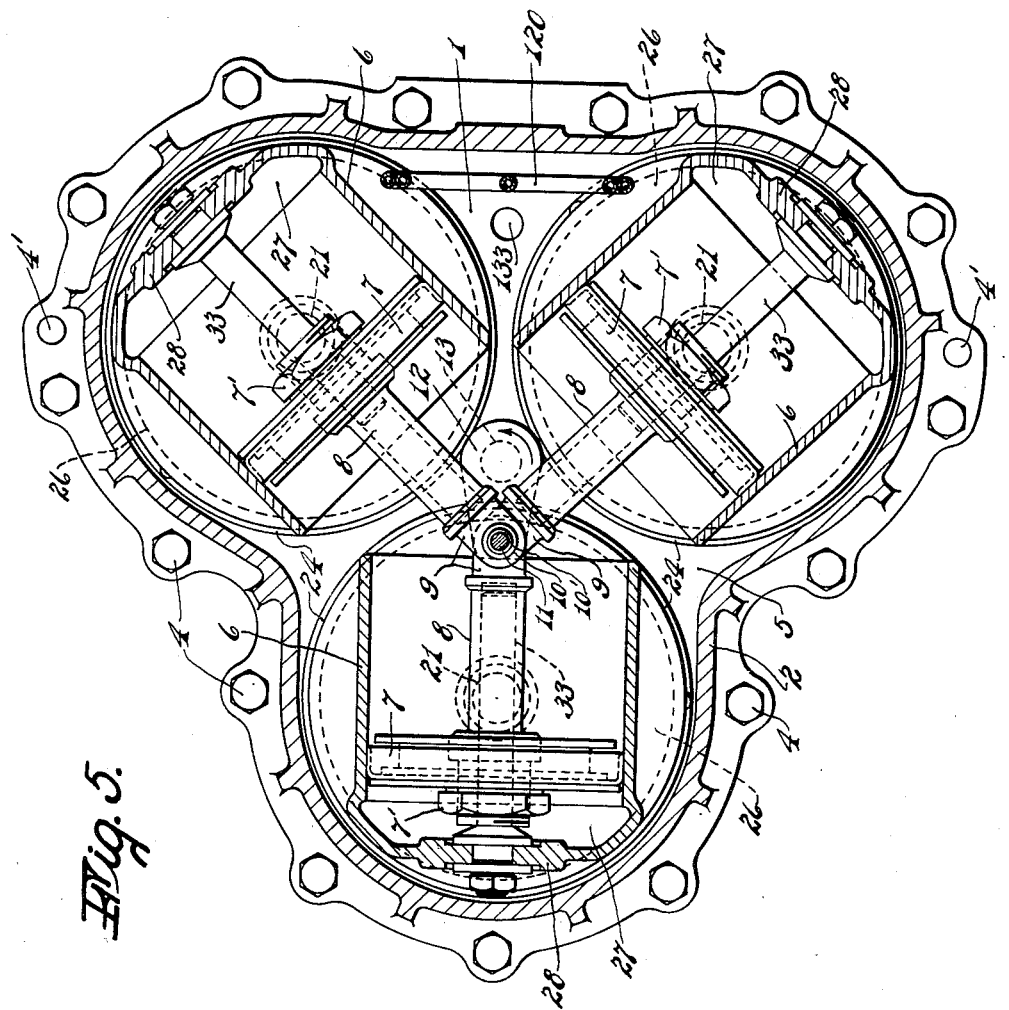

Jan. 9, 1951 A. L. GRISÉ 2,537,751
OSCILLATING CYLINDER PISTON METER
Filed Oct. 10, 1947 9 Sheets-Sheet 5
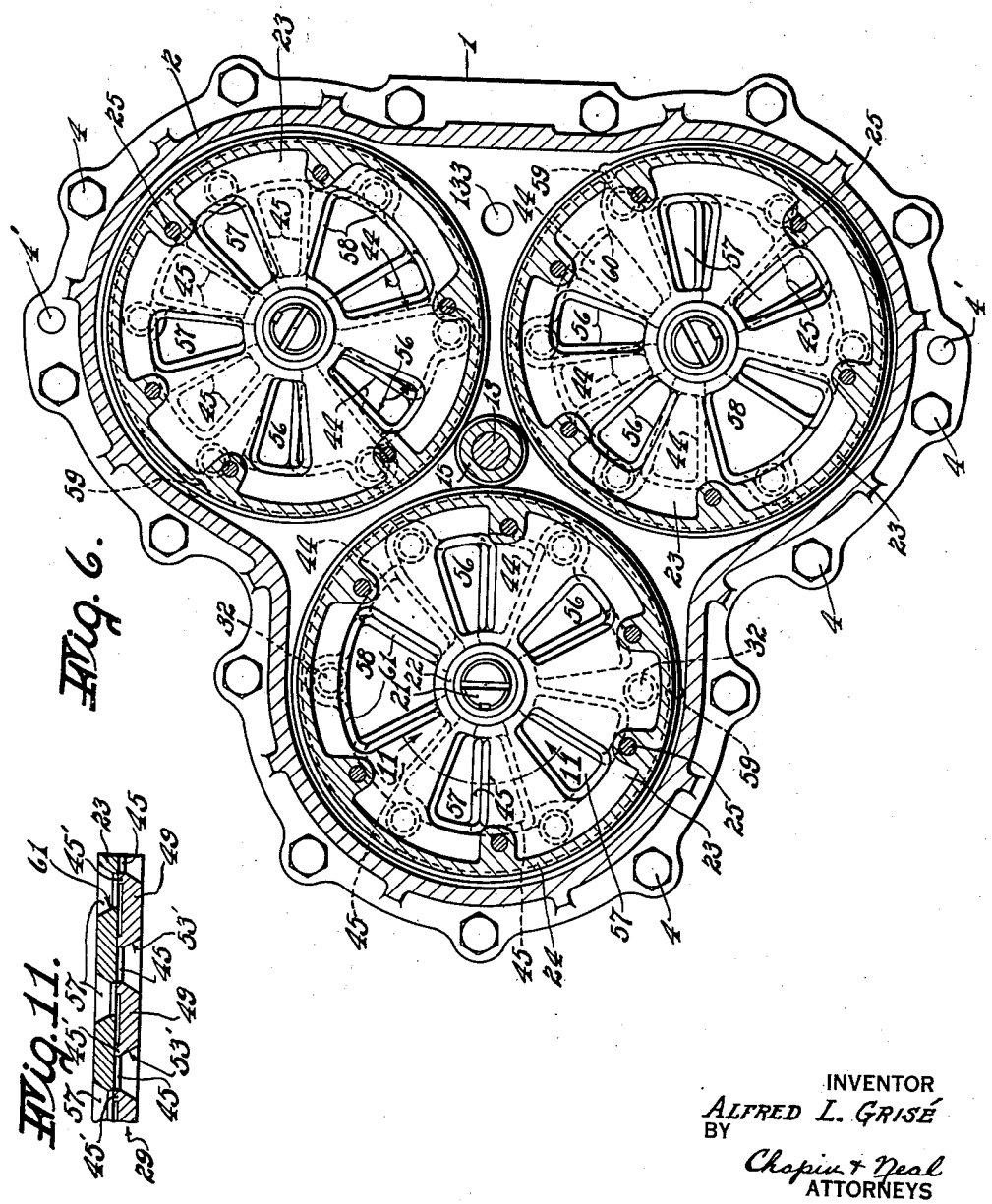
INVENTOR
ALFRED L. GRISÉ
BY
Chapin + Neal
ATTORNEYS Jan. 9, 1951                A. L. GRISÉ                2,537,751
                    OSCILLATING CYLINDER PISTON METER
Filed Oct. 10, 1947                                 9 Sheets-Sheet 6
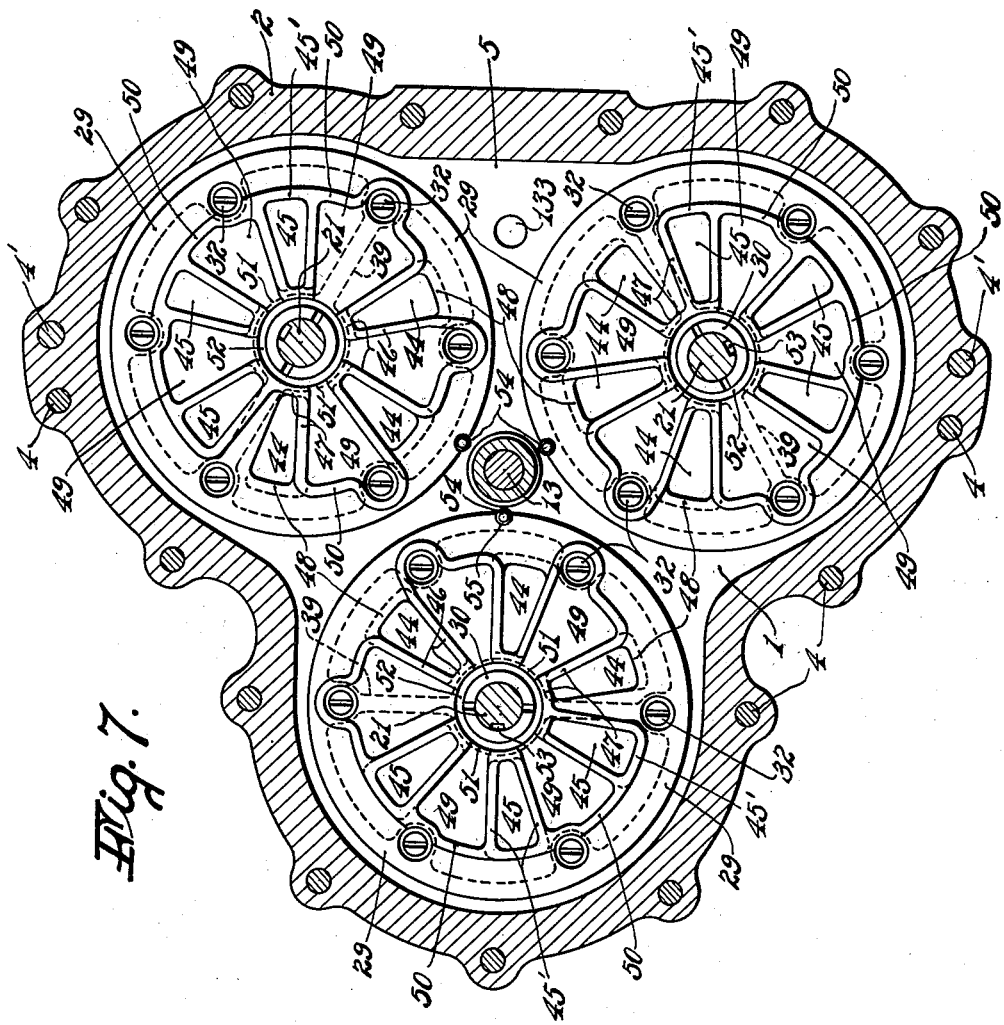
INVENTOR
ALFRED L. GRISÉ
BY
Chapin & Neal
ATTORNEYS

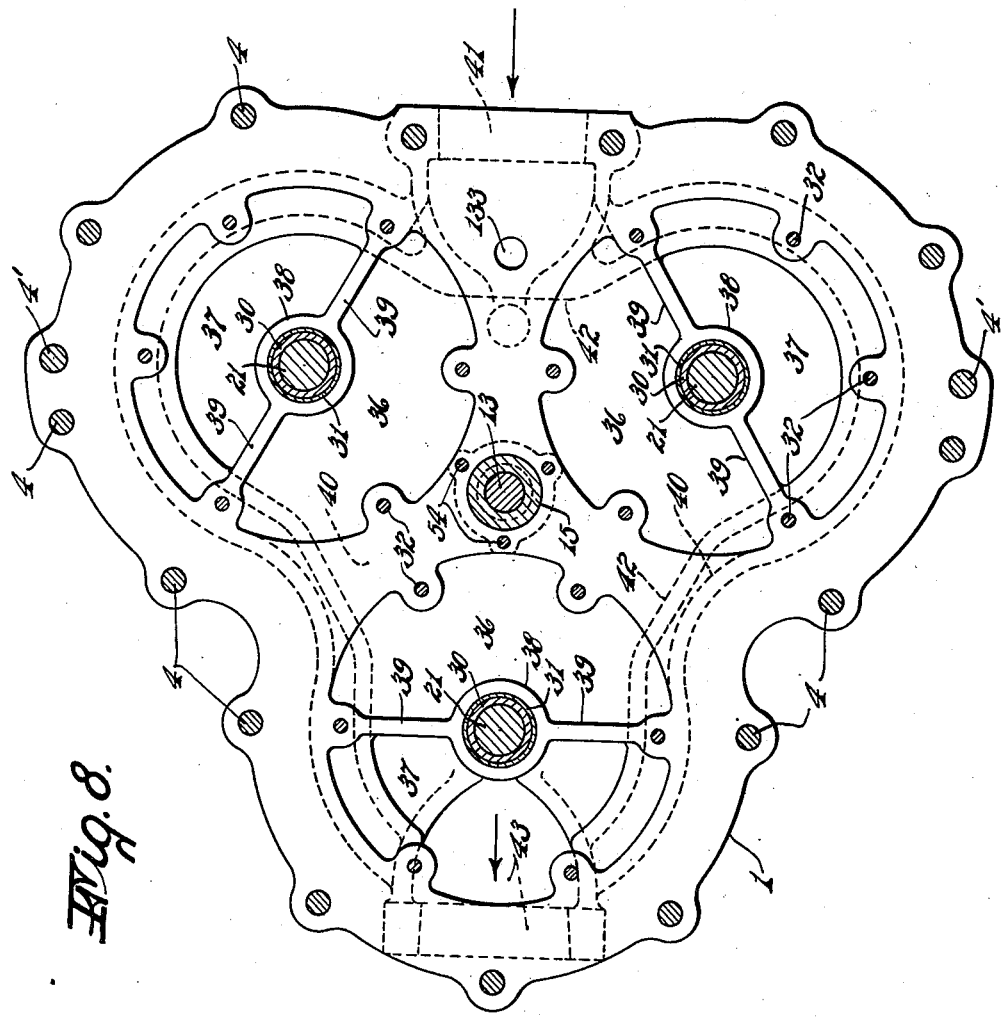

Jan. 9, 1951     A. L. GRISÉ     2,537,751
OSCILLATING CYLINDER PISTON METER
Filed Oct. 10, 1947     9 Sheets-Sheet 8

INVENTOR
ALFRED L. GRISÉ
BY
Chapin & Neal
ATTORNEYS

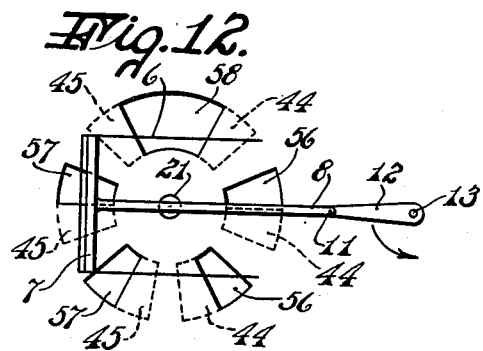
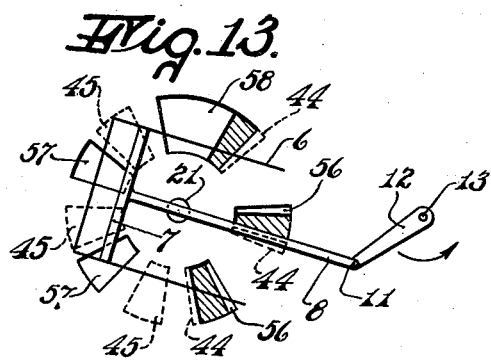
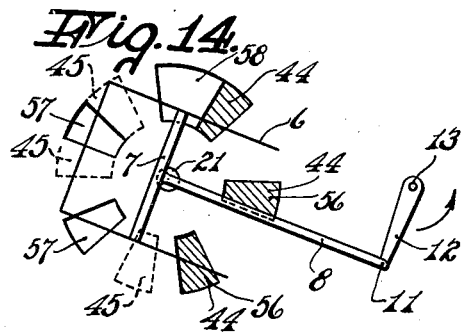
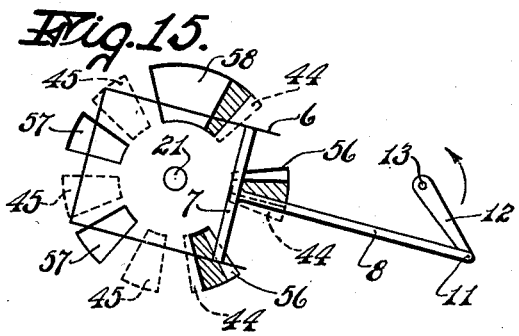
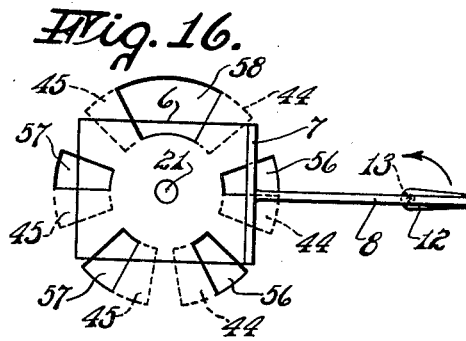
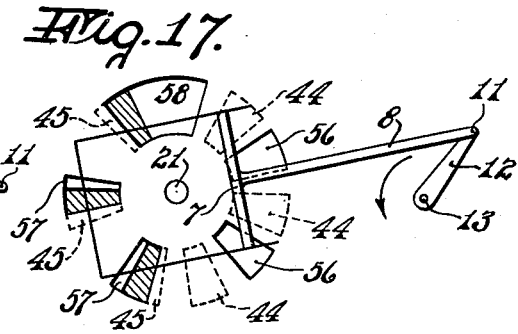
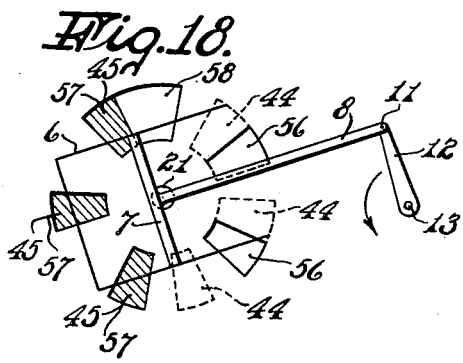
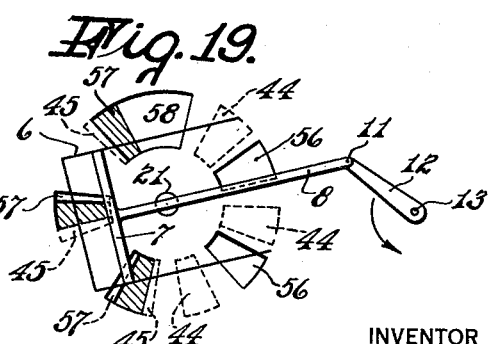

Patented Jan. 9, 1951

2,537,751

UNITED STATES PATENT OFFICE 2,537,751

OSCILLATING CYLINDER PISTON METER

Alfred L. Grisé, Springfield, Mass., assignor to Gilbert & Barker Manufacturing Company, West Springfield, Mass., a corporation of Massachusetts Application October 10, 1947, Serial No. 779,096

6 Claims. (Cl. 121—63)

This invention relates to liquid meters of the reciprocating piston type in which the reciprocation of the pistons causes the cylinders to oscillate and actuate valves controlling the admission of liquid to and the discharge of liquid from the cylinders.

The invention has for its general object to provide in a meter of the type described, various structural features and arrangements providing for ease of manufacture, durability and improved accuracy in operation.

The features of the invention will best be understood in connection with the detailed description of the one illustrative embodiment of it in the accompanying drawings, in which:

Fig. 2 is an end elevational view thereof;

Fig. 3 is a sectional elevational view taken on the line 3—3 of Fig. 1;

Figs. 4, 5, 6, 7, 8, 9 and 10 are sectional plan views taken on the lines 4—4, 5—5, 6—6, 7—7, 8—8, 9—9, and 10—10, respectively of Fig. 3;

Fig. 11 is a sectional view taken on the line 11—11 of Fig. 6; and

Figs. 12 to 19 are diagrammatical views illustrative of the operation of the valve mechanism of the meter.

Figure 1:
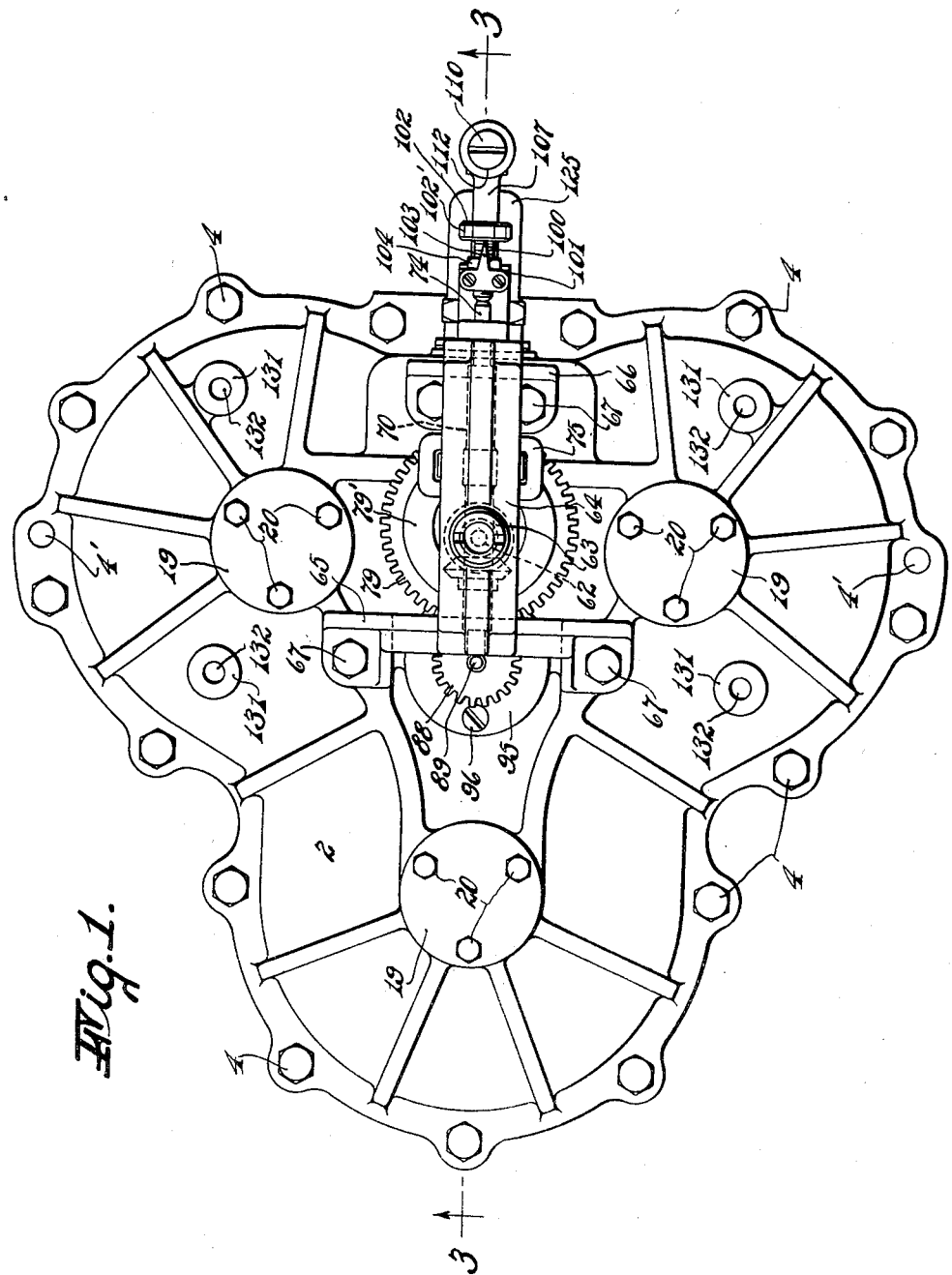
Fig. 1 is a top plan view of a meter embodying the invention.
Figure 9:
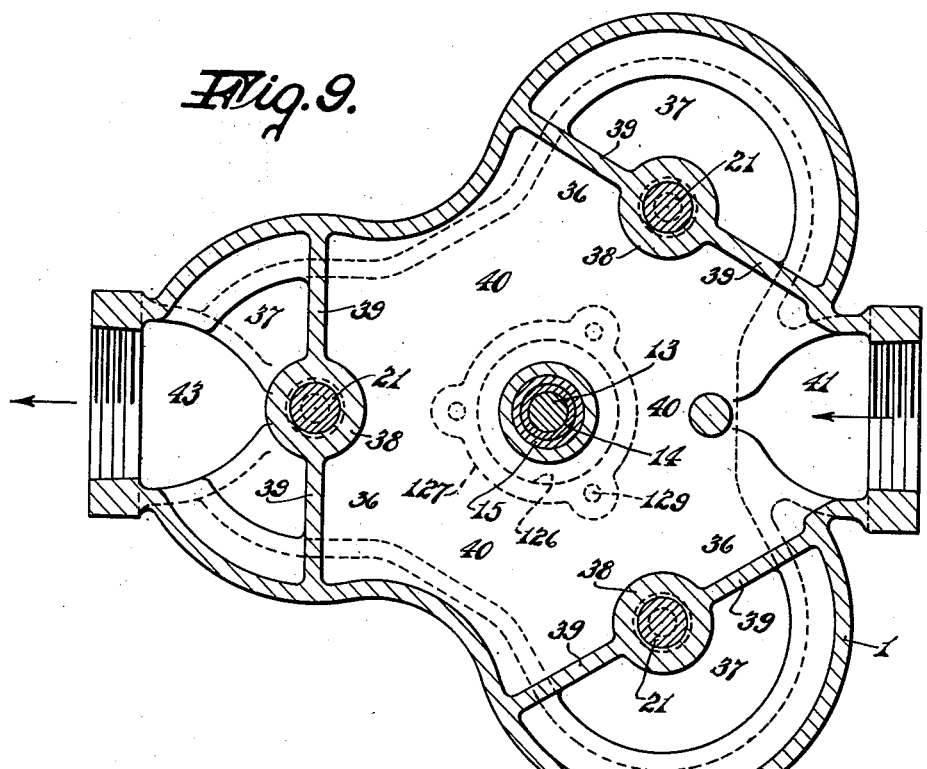
Figure 10:
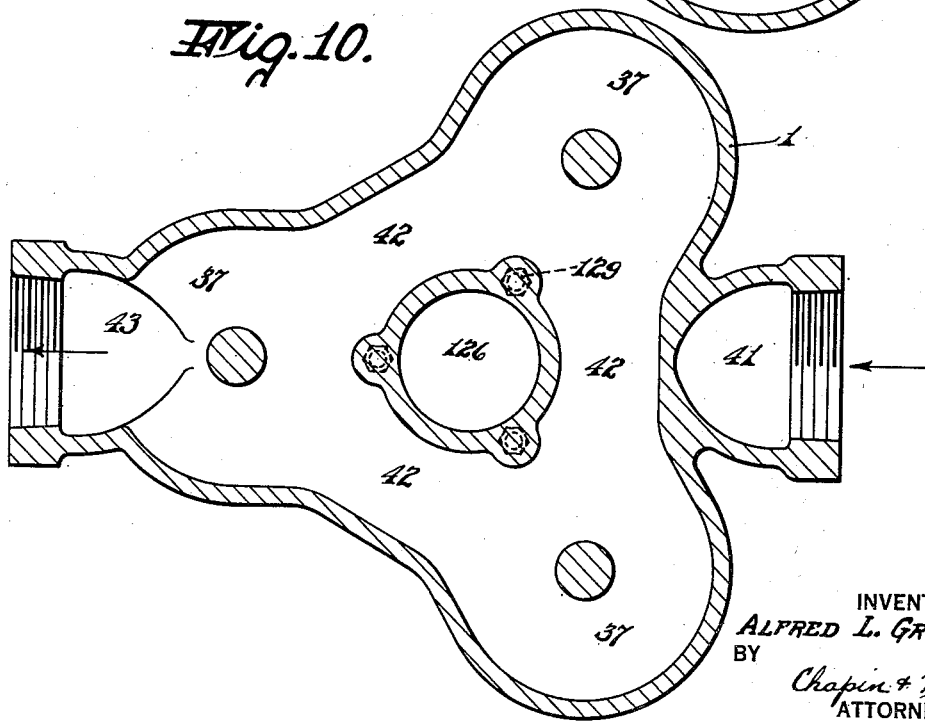

Referring to these drawings; the casing of the meter (Fig. 2) comprises two principal parts, a base casting 1 and a dome casting 2, the marginal flanges of which are clamped together with a gasket 3 therebetween, by a plurality of cap screws 4. The two castings are located accurately in proper relation by two dowel pins 4' (Fig. 1), fixed in one casting and closely fitting holes in the other casting. The dome 2 (Fig. 3) is hollow and affords within it a chamber 5 which houses all the moving parts of the meter.

The meter makes use of single acting cylinders of which there should be at least three and there may be more if desired. Referring to Fig. 5, three cylinders 6, have been shown. These are located generally radially with respect to the center of the chamber 5 and have their inner open ends in constant communication with the chamber. Each cylinder contains in a suitable piston 7, fixed by a nut 7' to a hollow piston rod 8, the outer end of which has a perforated ear 9. The several ears are located at different levels, as shown in Fig. 3, and a sleeve 10 is passed through the perforations of all the ears. This sleeve is rotatably mounted on an upstanding crankpin 11, fixed to a crank 12, which is fixed to the upper end of a shaft 13. The sleeve 10 is held in axial position on the crankpin 11 between a flange on the lower end of the pin and a snap ring 11', the latter being engaged in a circumferential groove near the upper end of the pin. The shaft 13 is rotatably mounted in two axially spaced sleeve bearings 14, fixed in a stud 15, the lower end of which is threaded into base 1 at the center thereof. A snap ring 13', engaged in a circumferential groove in the lower end of shaft 13, prevents the latter from moving upwardly. A thrust type ball bearing 16 is interposed between the lower face of the crank 12 and the upper end face of the upper bearing 14.

Each cylinder 6 is mounted on trunnions for oscillation about a vertical axis. The upper wall of each cylinder has formed integrally therewith a trunnion 17, mounted in a ball bearing 18, which in turn is mounted in a cylindrical recess formed in a cover 19. The latter is clamped to the top wall of dome 2, with a gasket therebetween, by a plurality of screws 20. The lower trunnions consist of studs 21 indicated in Fig. 5. Each stud, as indicated in Fig. 3, is threaded into base 1 and upstands therefrom. The upper end of each stud 21 is rotatably received in the central hub 22 of a valve plate 23. Each plate 23 is set into a counterbore in the lower end of an annular wall 24 and secured thereto, as by screws 25 (see also Fig. 6). This wall 24 forms a supporting base for the overlying cylinder 6. Within each wall 24 is a cylindrical chamber 26, which is connected to the overlying cylinder 6 by a vertical passage 27, formed between the outer end of such cylinder and its rear wall 28. Liquid enters and leaves each cylinder 6 by way of a passage 27 and chamber 26 and the valve that underlies such chamber. The valve plate 23 of each cylinder rests on certain surfaces of an underlying valve seat plate 29, which is fixed to base 1 coaxially of the trunnions 17 and 21. This plate 29 is held at a central point to base 1 by the flange on the upper end of a hollow screw 30, which encompasses stud 21 and is threaded into the base. The flange of screw 30 presses against a gasket 31 and the latter against a shoulder formed in the counterbore of the central opening in the valve seat plate. The latter is further held at spaced points about its periphery to base 1 by a plurality of screws 32 (see also Fig. 7).

Fixed to the rear wall 28 of each cylinder 6 at its outer end is a cylindrical rod 33 (Fig. 5) which extends forwardly in the cylinder and coaxially thereof, serving as a slide for a sleeve bearing 34 (Fig. 3), fixed in the tubular piston rod 8 near the inner end thereof. As will be clear from Fig. 5, as each piston 7 reciprocates in its cylinder 6 to rotate the crankshaft 13, the cylinder will be oscillated back and forth about the common axis of its trunnions 17 and 21 by means of the piston rod 8. The motion is transmitted from each piston rod 8 to its cylinder 6 through the rigid rod 33 on which the piston rod has a close sliding fit. No part of the piston proper is utilized for the purpose. Rod 33 preferably has one or more longitudinal grooves 35 (Fig. 3) therein to allow liquid to freely enter and leave the space between the inner end of rod 33 and the interior wall of piston rod 8 and also to provide lubrication for the engaged and relatively slidable surfaces of the two rods. The rods 33 also support their pistons 7 against the action of gravity. The weight of each piston is borne by a rod 33 and the engaged and relatively slidable surfaces of the two rods 8 and 33 are better designed to take the wear than is the piston leather of the piston which, in ordinary constructions, is pressed by gravity against its cylinder wall at one location.

Referring next to Fig. 8, there are formed in base 1 beneath each valve seat 29, an inlet chamber 36 and an outlet chamber 37. These chambers at their upper ends are roughly semi-cylindrical in form and are separated by a diametrically disposed partition, comprising a central boss 38, in which stud 21 is fixed, and two straight walls 39 extending in opposite directions from the boss to the outer walls of the chambers. Each of these partitions is located at right angles to a line extending from the center of crankshaft 13 through the center of the boss 38. The three inlet chambers 36 are located adjacent each other in partial confronting relation and each is connected to the other by a passage 40 (see also Fig. 9). The inlet chambers 36 and the passages 40 are located at an upper level in base 1 (Fig. 3), extending downwardly only about half way through the base. The main inlet passage 41 (Fig. 9) connects with one of the passages 40. The outlet chambers 37 are deeper than the inlet chambers, as shown in Fig. 3, and they are each interconnected by a passage 42 (Fig. 10) arranged at a lower level than the passage 40. The main outlet passage 43 connects directly with one of the discharge chambers 37.

The valve seat plates 29 will next be described. Each such plate (Fig. 3) has a flat lower face to rest on the flat machined upper face of the base 1 and is adapted to be clamped, liquid tight, to said upper face. All the plates 29 are shown in Fig. 7. Extending through each plate are three angularly-spaced inlet ports 44 and three angularly-spaced outlet ports 45. Each outlet port 45 is completely surrounded by a marginal wall 45', raised slightly above the upper face of plate 29 (Fig. 11) and having a flat top surface to be engaged by the lower face of valve plate 23. Similar upstanding marginal walls 46 surround the radial sides and the inner end of all the inlet ports 44 except one which has a wall 47 along one radial side only and along its inner end. The outer end of each inlet port is open so that some liquid can pass radially inward through the spaces 48 into the cylinder 6 for a purpose to be later described.

There are spaces 49 between each successive pair of ports in the valve seat plate except one. Each such space 49 is sealed off from the dome chamber by an outer marginal wall 50 which interconnects the adjacent pair of radial walls 45', 46, or 47 as the case may be. These spaces 49 connect by their open inner ends 51 with an annular space 52 between the peripheral wall of the counterbore of the central opening in plate 29 and the flanged head of screw 30. A groove 53 in stud 21 connects the space 52 to the chamber 26 of the overlying cylinder (see Fig. 3). Liquid may thus enter several spaces 49 and exert upward pressure on portions of the overlying valve plate 23 to offset some of the down thrust of plate 23 on the valve seat plate 29.

The valve seat plate 29 is preferably formed of carbon and the upper surfaces of all the marginal walls 45', 46, 47 and 50 are finished so that they all lie in the same plane. These surfaces are the bearing surfaces for the valve plate and the total area of these bearing surfaces has been reduced as low as is feasible. The radial walls (Fig. 11), and the outer end wall of each port (Fig. 3), is preferably bevelled as shown at 53'. A dowel pin 54 (Fig. 7) fixed in base 1 engages in a peripheral notch 55 in the valve seat plate 29 to accurately locate such plate in proper position on base 1.

The valve plate 23 is shown in Fig. 6, looking downwardly on the same in the same direction as Fig. 7, which shows the valve seat plate, was taken. This plate 23 has extending through it two inlet ports 56, two outlet ports 57 and a larger port 58 which serves part of the time as an inlet port and part of the time as an outlet port. The valve plate is accurately located in proper position in its seat in wall 24 by means of a projection 59 on such wall engaging in a notch 60 in the valve plate. The two radial walls (Fig. 11) and the outer wall (Fig. 3) of each port in plate 23 is preferably bevelled as shown at 61 (see also Fig. 11).

It should be noted that when a piston 7 is at either end of its stroke, all the inlet ports 44 and all the outlet ports 45 in its plate 29 are closed. The overlying ported valve plate 23 moves just far enough to close these ports without any overlap. This is shown diagrammatically in Figs. 12 and 16. It is also shown in Fig. 6 in connection with the left hand pair of plates 23 and 29. As plate 23 turns to close either the inlet or the outlet ports, one radial edge of each such port in a plate 23 moves toward a radial edge of the port which it controls in plate 29, until the two radial edges lie exactly one above the other in the same vertical plane. These ports are then exactly closed. This condition is shown in Fig. 11 in connection with the ports 45 and 57. From the above explanation, it will be clear why the inlet and outlet ports in Fig. 3 appear to be open although actually they are closed. A vertical plane passed through the horizontal center line of the left hand pair of plates 23 and 29 in Fig. 6 will include one pair of meeting edges of ports 45 and 57 and one pair of meeting edges of ports 44 and 56. Consequently, no surfaces have been cut to be cross hatched in Fig. 3.

The operation of the valve mechanism will best be understood from the diagrammatical views in Figs. 12 to 19 inclusive. These views show various steps in one complete cycle of operation of one valve mechanism, starting in Fig. 12 with the piston at outer dead center position, showing in Figs. 13, 14 and 15 successive steps in the intake stroke of the piston, showing in Fig. 16 the parts in inner dead center position, and showing in Figs. 17, 18 and 19 successive steps in the discharge stroke of the piston. The cylinder 6, piston 7, piston rod 8, and crank 12, crankpin 11, trunnion 21 and shaft 13 are represented merely in conventional form. Only the ports 56, 57 and 58 of the valve plate 23 are shown and only the ports 44 and 45 of the valve seat plate 29 are shown. The shaded areas represent the extent of effective port openings. Rotation of the crankshaft 13 is counterclockwise, as indicated by the arrow. The cylinder and valve mechanism illustrated are those shown in section in Fig. 3, or at the left in Fig. 5. When the piston of this particular cylinder is in its outer dead center position, the crankshaft 13 is being turned by the piston in the preceding cylinder reckoned in a clockwise direction or the upper right hand cylinder in Fig. 5. The piston in the other cylinder (lower right hand cylinder in Fig. 5) is on its discharge stroke. The power and discharge strokes of the three pistons overlap one another by 60 degrees. There is always one piston acting to turn the crankshaft 13 and part of the time there are two such pistons acting to turn the crankshaft.

Referring now to Fig. 12, the discharge ports 45 have just been closed and the piston 7 is about to move outwardly and, as it does so, the cylinder 6, and the valve plate 23 carried thereby, will be moved on its trunnions in a clockwise direction. The port 58 will move to partially overlap the adjacent inlet port 44 and the ports 56 will move to partially overlap the other two inlet ports, whereby liquid under pressure from the inlet 41 will enter the rear end of cylinder 6 to move the piston 7 therein outwardly. The amount of overlapping of the described ports and thus the effective intake port area increases as the piston advances, slowly at first and then more rapidly until the ports are nearly wide open when the piston has reached the position shown in Fig. 13. The inlet ports become wide open when the piston has moved outwardly far enough so that the rod 8 and crank 12 are at right angles, as shown in Fig. 14 the cylinder 6 having then been swung in a clockwise direction as far as possible. Further outward movement of this piston will then cause the cylinder 6 to swing in a counterclockwise direction. The inlet ports then begin to close, slowly at first, then rapidly, when the piston is positioned as in Fig. 15, then more slowly as the piston near the end of its power stroke and finally the ports close fully when the piston reaches its inner dead center position shown in Fig. 16. At this time, the crankshaft 13 is being turned by the piston in the cylinder at the lower right in Fig. 5. The cylinder continues to swing clockwise so that the port 58 in the valve plate begins to overlap the adjacent discharge port 45 in the valve seat plate and the two ports 57 in such plate begin to overlap the other two discharge ports 45. Liquid will now be forced out of this cylinder 6 into the outlet 43. The discharge ports open slowly at first, then more rapidly as the piston moves into the position shown in Fig. 17 becoming fully open when the piston reaches the position shown in Fig. 18. The cylinder 6 has now reached the other extreme of its counterclockwise movement. Further inward movement of the piston will swing the cylinder 6 in a clockwise direction so that the discharge ports will begin to close, as shown in Fig. 19, and become fully closed when the piston reaches its outer dead center position shown in Fig. 12.

The crankshaft 13 (Fig. 3) is arranged to drive a register of any suitable kind through a variable speed transmission which is operable, manually or automatically, to vary the speed ratio between the crankshaft 13 and the driven shaft 62, which carries a coupling element 63, adapted for connection to a mating coupling element (not shown) on the driving shaft of the register. This shaft 62 is mounted with its axis vertically disposed in the cross bar portion 64 of a bracket, having spaced legs 65 and 66 (see also Fig. 1) which are secured as by cap screws 67 to the dome casting 2. Fixed to the lower end of shaft 62 (Fig. 3) is a bevel gear 68, meshing with a bevel gear 69 on a shaft 70, which is rotatably mounted at its ends one in each of the legs 65, 66 by means of the ball bearings 71. The shaft 70 is held against axial movement between said bearings as shown. Shaft 70 has integral therewith a hardened cylindrical portion 72, forming a roll. Beneath shaft 70 is a shifter element (Figs. 3 and 4), comprising two axially-aligned rods 73 and 74 and an intervening yoke 75, which is pinned to each rod. The rods 73 and 74 are mounted for sliding movement in the direction of their common axis, one in leg 65 and the other in leg 66. Rod 74 (Fig. 3) has a pin 76 fixed to and extending diametrically through it with projecting ends which ride one in each of two slots 77. These slots parallel the axis of the rods and are formed in the boss in which rod 74 is slidably mounted. The pin 76 prevents the rod 74, and connected elements 73 and 75, from turning but allows them to slide axially. A spring 78 (Figs. 3 and 4) on rod 73 acts between leg 65 and yoke 75 to move the latter to the right. Movement of yoke 75 to the left may be effected, manually or automatically, as will later be described. Beneath the yoke 75 is a gear 79, rotatable on a vertical axis and having fixed to its upper face a hardened annular track 79'. Mounted in yoke 75 (Fig. 3) are two superposed balls 80. One ball rests on track 79'. The other ball rests on top of the first ball and engages the roll 72 on shaft 70. Each ball 80 (Fig. 4) closely fits between the flanged heads 81 of a pair of studs fixed in axial alignment in the yoke and engaging the ball at diametrically opposite points. Each ball is likewise held between a pair of rollers 82, rotatably mounted in the yoke with their axes paralleling those of the studs. These rollers are located one on each side of its ball and engage the latter at diametrically opposite points. As viewed in plan, each ball is engaged at four points, spaced ninety degrees apart. The two balls 80 have point contact with each other and the upper ball has point contact with roll 72, while the lower ball has point contact with track 79'. The gear 79 is rotatably mounted by means of a pair of radial ball bearings 83 on a vertical stud 84 fixed to dome 2. Encompassing the lower part of stud 84 is a thrust type ball bearing 85, having one race resting on top of dome 2 and the other supporting a washer 86. A spring 87, encircling the depending hub of gear 79, acts between washer 86 and the gear to press the latter upwardly, forcing the track 79' against the lower ball 80, the lower ball 80 against the upper ball 80, and the latter against roll 72. These parts are forced together under considerable pressure, sufficient to provide a non-slip transmission between the gear 79 and shaft 70. The gear 79 is driven by a pinion 88, fixed on the upper and outer end of a vertical shaft 89. The lower and inner end of this shaft has fixed thereto a crank 90, perforated to receive an extension 91 of the crankpin 11. Thus, the shaft 62 may be driven from the crankshaft 13, which in turn is driven by the liquid-pressure actuated pistons 7.

The shaft 89 is preferably mounted in a manner to permit easy assembly in or removal from dome 2. As shown in Fig. 3, it is mounted near its ends in longitudinally spaced bearings, one in the closed inner end of a hollow cylindrical case 93 and the second in a plug 94, threaded into and closing the upper end of said hollow case. The case has a top flange 95 which is clamped by several screws 96 to the dome 2 with a gasket 97 therebetween. Within case 93 are upper and lower seal rings 98, encompassing shaft 89 and forced apart by a spring 99 on the shaft to engage seats, one on the top face of bearing 92 and the other on the lower face of the plug 94. Leakage of liquid from chamber 5 along shaft 89 is prevented by the seal rings 98 and leakage from said chamber past flange 95 is prevented by the gasket 97. The case 93, with the shaft 89 mounted therein and carrying the gear 88 and crank 90 together with the seal rings, may be removed from the dome 2 as one unit after screws 96 have been removed.

For adjusting the variable speed transmission manually, a screw 100 (Fig. 3), threaded in an arm 101, supported by the leg 66 of the bracket described, is arranged to engage the outer end of rod 74. Assuming arm 101 to be held stationary, the rod 74 and connected parts may be caused to move radially inward or outward as the screw 100 is turned. This screw has a head 102, by means of which it may be turned. The periphery of this head may be provided with graduations 102' to be read with reference to a pointer 103 (see also Fig. 4), fixed to the top of arm 101. A lock nut 104 is provided on screw 100 to engage arm 101 and hold the screw in its various positions of adjustment.

To enable the variable speed transmission to be automatically adjusted, as for example to compensate for variations in temperature of the liquid passing through the meter, the arm 101 is made as part of a lever, pivotally mounted on a stud 105, the ends of which are mounted one in each of a pair of spaced ears 106 (Fig. 2) between which the lever is held. The other arm 107 (Fig. 3) of this lever extends horizontally outwardly and has threaded in its outer end a screw 108, which extends vertically below the arm 107 and has fixed to its lower end a ball 109. This screw 108 may be adjusted in its arm 107 by turning the slotted cylindrical head 110 of the screw by means of a screw driver. This head may be provided with graduations 111 which may be read with reference to a graduation 112 (Fig. 1) on arm 107. A lock nut 113 is provided to hold the screw 108 to arm 107 in its various positions of adjustment.

The ball 109 bears against a flange 114 on the piston element 115 of a thermostat. Such element is slidably mounted in the bore 116, of a cylinder 117 formed on the outer end of a member 118, which extends through and is supported from a wall of the dome 2. Member 118 has a passage 119 extending from the inner end of bore 116 to a tube 120, which is fixed at one end to the member 118 and has its other end closed. This tube is bent to form two coils (Fig. 5) which are located within the chamber 5 in contact with the liquid. To prevent leakage, the cylinder 117 and the piston 115 are interconnected by an expansible and contractible bellows 121 (Fig. 3), secured at one end to the inner end of the cylinder and at the other end to the piston. Holes 122 in the inner end of cylinder sleeve 117 permit liquid to flow back and forth into and out of the bellows 121 as the piston moves outwardly or inwardly, respectively, in its cylinder. The member 118 has on its inner end a flange which abuts the inner end face of a bushing 123, threaded into a side wall of dome 2. The outer end of member 118 is threaded to receive a nut 124, by which it is clamped to the bushing 123. This nut has a hollow extension 125, which encases the cylinder 117, bellows 121 and piston 115, except for the outer end of the latter which engages ball 109.

It will be clear that as the temperature of the liquid in chamber 5 rises, the liquid in tube 120 will expand and force the piston 115 outwardly, thus rocking the lever 101, 107 on its pivot 105 and forcing rod 74 and yoke 75 radially inward with respect to track 79', thus decreasing the speed ratio between the crankshaft 13 and shaft 62 to compensate for expansion of the liquid. Also, as the temperature of the liquid in chamber 5 falls, the liquid in the tube 120, will contract, whereupon spring 78 will shift the yoke 75 radially outwardly with relation to the track 79', forcing rod 74 outwardly and rocking lever 101, 107, clockwise as far as permitted by the piston 115 of the thermostat. Thus, the shaft 62 will be driven somewhat faster to compensate for the contraction of the liquid.

The crankshaft 13 and the hollow stud 15 extend through the base 1 into a recess 126 (Fig. 3). To prevent leakage from the chamber 5 past shaft 13 this recess is normally closed by a plate 127 and gasket 128, both held to the base by cap screws 129.

Suitable legs, such as 130 (Fig. 2), may be provided on base 1 to support the meter.

The dome casting 2 of the meter (Fig. 1) is preferably provided with a plurality of bosses 131 having tapped holes 132 therein. The brackets, which support the register, may rest on the bosses 131 and be held there by screws threaded into holes 132.

The meter is initially adjusted so that the register, which it drives by means of shaft 62, will indicate one gallon when the liquid discharged by the meter at sixty degrees Fahrenheit equals exactly one gallon or 231 cubic inches. Calibration of the meter is effected by turning screw 100 until the register shows the correct quantity when the above quantity of liquid at the stated temperature is discharged from the meter. The adjustment is then fixed by turning up the lock nut 104 against the arm 101.

With the meter calibrated as described, the operator will adjust the screw 108 for whatever gravity oil is to be measured. Oils of different gravities have different coefficients of expansion and it is necessary to adjust the meter, whenever a liquid having a different coefficient of expansion is to be measured. The operator may have a chart showing the proper setting of the screw, as indicated by the graduations 111, for oils of various gravities. Thus, for any particular oil, the operator can set the screw 108 properly to yield the correct measurement.

Having set the meter for the proper coefficient of expansion of the liquid to be measured, the thermostat will respond to variations in temperature of the liquid passing through the meter and automatically drive shaft 62 slower or faster than the normal rate for liquid at sixty degrees Fahrenheit, accordingly as the temperature of the liquid is above or below sixty degrees, so that when the register indicates one gallon, the quantity of liquid delivered by the meter will equal one gallon, when brought to the normal temperature of sixty degrees. When the liquid is above normal temperature more than 231 cubic inches will be delivered, when the register shows one gallon, but when the liquid delivered is reduced to the normal temperature it will occupy just 231 cubic inches. If the liquid is below normal temperature, less than 231 cubic inches will be delivered when the register indicates one gallon but, when this quantity of liquid is raised to normal temperature, it will expand so as to occupy exactly 231 cubic inches.

The operation of the valve mechanism, effected by oscillation of the cylinders 6 has been fully explained heretofore.

It should be noted that liquid is kept in circulation in the chamber 5. This is effected by allowing some liquid from the inlet 41 (Fig. 3) to pass into chamber 5 through a hole 133 in base I and by allowing liquid to leave the chamber 5 by way of the described spaces 48 (Fig. 7) in each valve seat plate 29 and thence by inlet ports 44, chamber 26 and passage 27 into each cylinder 6 to be subsequently discharged from the cylinder in the normal way above described. Each cylinder 6 acts to take in some of the liquid, which it measures, from the chamber 5. The three cylinders act in succession in counterclockwise order, as viewed in Fig. 5, each cylinder continuing to draw in liquid through the spaces 48 for an interval after the next cylinder in the series has started to draw in liquid. The arrangement keeps the liquid circulating in chamber 5 sufficiently so that the temperature in the chamber 5 will be the same as in the inlet 41.

The construction described has many advantages which enable economical manufacture. The base I is an ordinary casting with all chambers and passages formed therein by casting. The lower trunnions 21 and the stud 15, which contains the bearings 14 for the crankshaft 13, are made separate from the base so that the upper face of the base may be a single flat surface, capable of being machined at one operation. Aside from finishing the top face of base 1, all that remains to be done is to drill and tap the holes for screws 4 and 32 and for trunnions 21 and stud 14 and to drill the holes for dowel pins 4 and 54. Both the inlet 41 and outlet 43 are in the base 1 so that the dome 2 may be removed without disconnecting the piping. The cylinders 6, pistons 7 and all other moving parts may all be assembled on the base I before the dome 2 is applied. Each cylinder may be made as a simple die casting with no machining required, except drilling and tapping of holes for the screws which hold its valve plate 23 in place. Since each valve plate is separate from its cylinder, the latter can be formed by die casting and also the valve plates can be readily machined. The valve seat plates have to be machined and tapped and, being of carbon, a bearing separate from the seat is provided for the lower trunnion of the overlying cylinder. Each cylinder has upper and lower trunnions. All the cylinders are of equal height and alike in every respect as are the valve seat plates and valve plates. The valve plates are held to their seats by hydraulic pressure but liquid is admitted to the spaces 50 in the valve seat plates to press upwardly on the valve plates and offset some of the downward pressure acting to press the valve plates against the relatively narrow lands of the valve seat plates. The area of frictional engagement between these plates and the pressure holding them in engagement is made as small as feasible so that the plates will turn easily without leakage between them.

The construction described eliminates all side thrust of the pistons on their cylinders. As the crankshaft 13 rotates, the connecting rods 8 turn the cylinders 6 on their trunnions and maintain the connection between the pistons and crankpin always in a straight line which coincides with the axis of the cylinders. The thrust on each piston is always in the direction of its axis so that there is no side thrust on it as is the case where the cylinders are fixed. The supporting rods 33 on which the piston rods 8 slide take the weight of each piston from the peripheral wall of its cylinder and the transmission from each rod 8 to its cylinder for oscillating the same excludes the piston, thereby eliminating side thrust. This arrangement contributes both to durability and accuracy of operation.

The valve mechanism enables accuracy in operation and yet lends itself to ease of manufacture. The plates 23 and 29 may be manufactured in quantities at low unit cost and located with close accuracy by the means described on the base I or cylinder 6, as the case may be, so as to control the opening and closing of the ports with precision relative to the reciprocation of the pistons. As described above, the outlet ports of each cylinder close and the inlet valves for each cylinder open exactly at the end of the outward stroke of the piston for such cylinder and the inlet ports of each cylinder close and the outlet ports open exactly at the end of the inward stroke of the piston. Close accuracy of measurement is had even when the meter is operated at a small fraction of its capacity.

The invention thus provides in a meter of the reciprocating piston type, wherein the cylinders oscillate to actuate the valves, improved structure enabling ease of manufacture, and providing improved durability and improved accuracy of operation.

I claim:

1. A liquid meter, comprising, a base, a shaft mounted in said base and upstanding therefrom at right angles, a plurality of single-acting cylinders each having a closed outer end and an open inner end, said cylinders being mounted on and with their axes in parallel relation with said base and with their open inner ends in adjacent relation and closely adjacent said shaft, said cylinders being angularly spaced in a circular series around said shaft, a crank on said shaft, a piston reciprocable in each cylinder, rods one for each cylinder and each fixed at its outer end to the outer and closed end of its cylinder and extending coaxially thereof toward and terminating closely adjacent to the open end thereof, hollow piston rods one for each piston each fixed at its outer end to its piston and being slidably mounted on a first-named rod, each piston rod having a closed inner end pivotally connected to said crank, each cylinder being pivoted to said base for oscillation about an axis parallel with said shaft, each piston rod being swung back and forth by the crank during each stroke and acting through its first-named rod and the closed end of its cylinder to oscillate the latter, and valve means on each cylinder actuated by the oscillation thereof to control the admission of liquid to and the discharge of liquid from the closed end thereof.

2. A liquid meter, comprising, a base having a plane upper face, a hollow post secured to said base and upstanding from said face at right angles thereto; three circular valve seat plates resting on said face, equally spaced angularly in a circular series around said post, and substantially tangential thereto; each said plate being fixed to said base and having inlet and outlet ports therethrough, said base having inlet and outlet passages respectively communicating with said inlet and outlet ports, a crankshaft journalled in said hollow post with its crank located above the top of the post, three single-acting cylinders having their axes paralleling said face and having open inner ends confronting said crankshaft; each cylinder having a closed outer end, a hollow cylindrical supporting member affording within it a chamber, and having a passage connecting the cylinder near its closed end to said chamber; a circular valve plate secured to said hollow cylindrical member and having inlet and outlet ports therethrough and closing the bottom of said chamber except for such ports, said valve plates resting on and rotatable relative to said seat plates, trunnions one for each cylinder each connecting its supporting member to the base for oscillation about the common axis of the superposed valve and seat plates, a piston reciprocable in each cylinder, a piston rod for each piston and fixed at one end thereto, the other end of each piston rod being pivotally connected to said crank, each piston rod having an opening extending from its outer end and the outer side of said piston through and beyond the latter and terminating adjacent its pivotal connection to said crank, and guide rods one for each cylinder and each fixed at one end to the closed end of its cylinder and projecting coaxially of the latter into said opening in the piston rod, each piston rod as it reciprocates swinging back and forth and through its guide rod swinging its cylinder about its axis of oscillation to shift the ports in the valve plate relatively to the ports in the seat plate to control the admission of liquid to and the discharge of liquid from its cylinder.

3. A liquid meter, comprising, a base having a plane upper face, a cylindrical hollow post fixed to the base centrally thereof and upstanding from said face, a crankshaft journalled in said hollow post, three trunnions fixed to said base and upstanding from said face with their axes paralleling the axis of said crankshaft, said trunnions being equally spaced radially from said crankshaft and equally spaced angularly one from another in a circular series, said base having inlet openings therein one between each trunnion and said post and each extending downwardly from said face, said base having therein an inlet chamber connecting at its end portions with said inlet openings, said base having three outlet openings therein one adjacent each inlet opening and on the opposite side of the adjacent trunnion, said base having therein a discharge chamber underlying the inlet chamber with end portions extending beyond the corresponding end portions of the inlet chamber and connecting one with each outlet opening, circular seat plates fixed to said face of the base and one encompassing each trunnion in coaxial relation, each seat plate overlying the adjacent pair of inlet and outlet openings and having through it inlet and outlet ports respectively communicating with such inlet and outlet openings, circular valve plates turnably mounted one on each trunnion and resting on a seat plate, each valve plate having inlet and outlet ports respectively movable into and out of communication with the inlet and outlet ports in the seat plate as the valve plate is turned about the axis of its trunnion, three single-acting cylinders each having a piston-receiving bore the axis of which parallels said face and having a supporting member of hollow cylindrical form affording a chamber below said bore; each cylinder having a closed outer end, an open inner end, and a passage connecting the outer end of its bore to the chamber in said member; said valve plates being fixed one to each supporting member and forming the bottom wall of the chamber therein, said members being substantially tangential to said post, a guide rod fixed to the closed end of each cylinder and extending coaxially of the cylinder toward and terminating near its inner end, a hollow piston rod slidably mounted on each guide rod and having a closed outer end pivotally connected to the crank of said crankshaft, and a piston fixed to the inner end of each piston rod.

4. In a liquid meter, a base, a valve seat plate fixed thereto and having inlet and outlet ports therethrough, a trunnion fixed to the base and extending with its axis at right angles to the base through said plate coaxially thereof, a hollow screw encompassing the trunnion and threaded into the base for holding the central part of the plate to the base, said plate having relatively narrow lands upstanding from it and embordering the ports therein and the spaces between such ports, said base having inlet and outlet passages respectively communicating with the inlet and outlet ports, a cylinder, a valve plate fixed to the cylinder and resting on said lands, said valve plate mounted to turn on said trunnion and having inlet and outlet ports therethrough, said cylinder having a piston-receiving bore with its axis at right angles to that of said trunnion, said cylinder having a head closing its outer end and having an open inner end together with a passage connecting the outer end of said bore to both the inlet and outlet ports of the valve plate, a piston reciprocable in said cylinder, a piston rod fixed at its outer end to the piston, a shaft rotatively mounted in said base, a crank fixed on said shaft and pivotally connected to the inner end of said rod, whereby as the piston reciprocates in the bore of its cylinder the latter is oscillated about the axis of said trunnion to turn the valve plate on the seat plate and shift the ports in the former relatively to the latter to control the admission of liquid to and the discharge of liquid from the cylinder, a hollow dome mounted on the base and enclosing the parts mounted thereon, said base having a passage connecting said inlet passage to the interior of the dome for admitting liquid to press the valve plate against the lands on the seat plate, the latter having an annular recess surrounding said hollow screw and closed by the overlying valve plate, the seat plate having passages connecting each said space in the seat plate with said annular recess and there being a passage between the trunnion and its bearing in the valve plate for connecting said annular recess to said passage in said cylinder, whereby liquid under pressure may be admitted to said spaces to counteract some of the pressure acting to hold the valve plate to the lands on the seat plate.

5. In a liquid meter, a base having a plane upper face and main inlet and outlet passages therein opening through said face, a valve seat plate fixed to said face of the base and having therethrough inlet and outlet ports respectively communicating with said inlet and outlet passages, said plate having upstanding from its upper face relatively narrow lands embordering the ports therein and the spaces between said ports, a cylinder, a trunnion connecting the cylinder and base for oscillation of the cylinder about an axis at right angles to said face, a valve plate fixed to the cylinder and resting on said lands and having inlet and outlet ports therethrough, said cylinder having a piston-receiving bore the axis of which parallels said face and a passage connecting such bore to both the inlet and outlet ports in the valve plate, a piston in said cylinder, a rod fixed at its inner end to the piston, a shaft rotatively mounted in said base with its axis parallel to said axis of oscillation, a crank fixed at one end to the shaft and pivotally connected at its other end to the inner end of the piston, whereby as the piston reciprocates in its cylinder the latter is turned back and forth about said axis of oscillation to turn the valve plate on the seat plate and shift the ports in the valve plate relatively to the ports in the seat plate to control the admission of liquid to and the discharge of liquid from said cylinder, a dome mounted on said base forming a chamber housing the cylinder, piston rod, crank shaft and valve and seat plates, said base having a by-pass passage extending from the main inlet passage to said chamber, to admit liquid under pressure into said chamber to press the valve plate against the lands on the seat plate, said seat plate having a central chamber communicating with all said spaces and there being a passage connecting the last-named chamber to said passage in the cylinder, whereby liquid under pressure is admitted to said spaces to press upwardly on the valve plate and counteract some of the downward pressure thereon.

6. In a liquid meter, a base having therein a single inlet chamber and a single outlet chamber and inlet pipe and outlet pipe connections to the inlet and outlet chambers respectively, said base having a plane upper face and main inlet and outlet passages extending upwardly from the inlet and outlet chambers respectively to said face, a valve seat plate fixed to said face of the base and having therethrough inlet and outlet ports respectively communicating with said inlet and outlet passages, said plate having upstanding from its upper face relatively narrow lands embordering the ports therein and the spaces between said ports, a cylinder, a trunnion connecting the cylinder and base for oscillation of the cylinder about an axis at right angles to said face, a valve plate fixed to the cylinder and resting on the lands of the seat plate and having inlet and outlet ports therethrough, said cylinder having a piston-receiving bore the axis of which parallels said face and a passage connecting such bore to both the inlet and outlet ports in the valve plate, a piston in said cylinder, a rod fixed at its inner end to the piston, a shaft rotatively mounted in said base with its axis parallel to said axis of oscillation, a crank fixed at one end to the shaft and pivotally connected at its other end to inner end of the piston, whereby as the piston reciprocates in its cylinder the latter is turned back and forth about said axis of oscillation to turn the valve plate on the seat plate and shift the ports in the valve plate relatively to the ports in the seat plate to control the admission of liquid to and the discharge of liquid from said cylinder, a dome mounted on said base forming a chamber housing the cylinder, piston rod, crank, shaft and valve and seat plates, said base having a by-pass passage extending from the main inlet passage to said chamber, and said seat plate having a relatively small passage from one of its inlet ports to said chamber, the flow of liquid to the cylinder being divided, a larger part coming directly from the main inlet passage in the base to the inlet port and a smaller part coming through said last-named small passage from said chamber and by-pass passage, whereby to keep the liquid in said chamber in circulation.

ALFRED L. GRISÉ.

REFERENCES CITED

The following references are of record in the file of this patent:

UNITED STATES PATENTS

| Number | Name | Date |
| --- | --- | --- |
| 183,850 | Higgins | Oct. 31, 1876 |
| 2,206,540 | Whittaker | July 2, 1940 |
| 2,208,687 | Renfrew | July 23, 1940 |
| 2,414,596 | Griffith et al. | Jan. 21, 1947 |

FOREIGN PATENTS

| Number | Country | Date |
| --- | --- | --- |
| 581,851 | Germany | Aug. 3, 1933 |